June 28, 1960 L. G. CLARK 2,942,834
VIBRATION ABSORBER
Filed Jan. 14, 1957
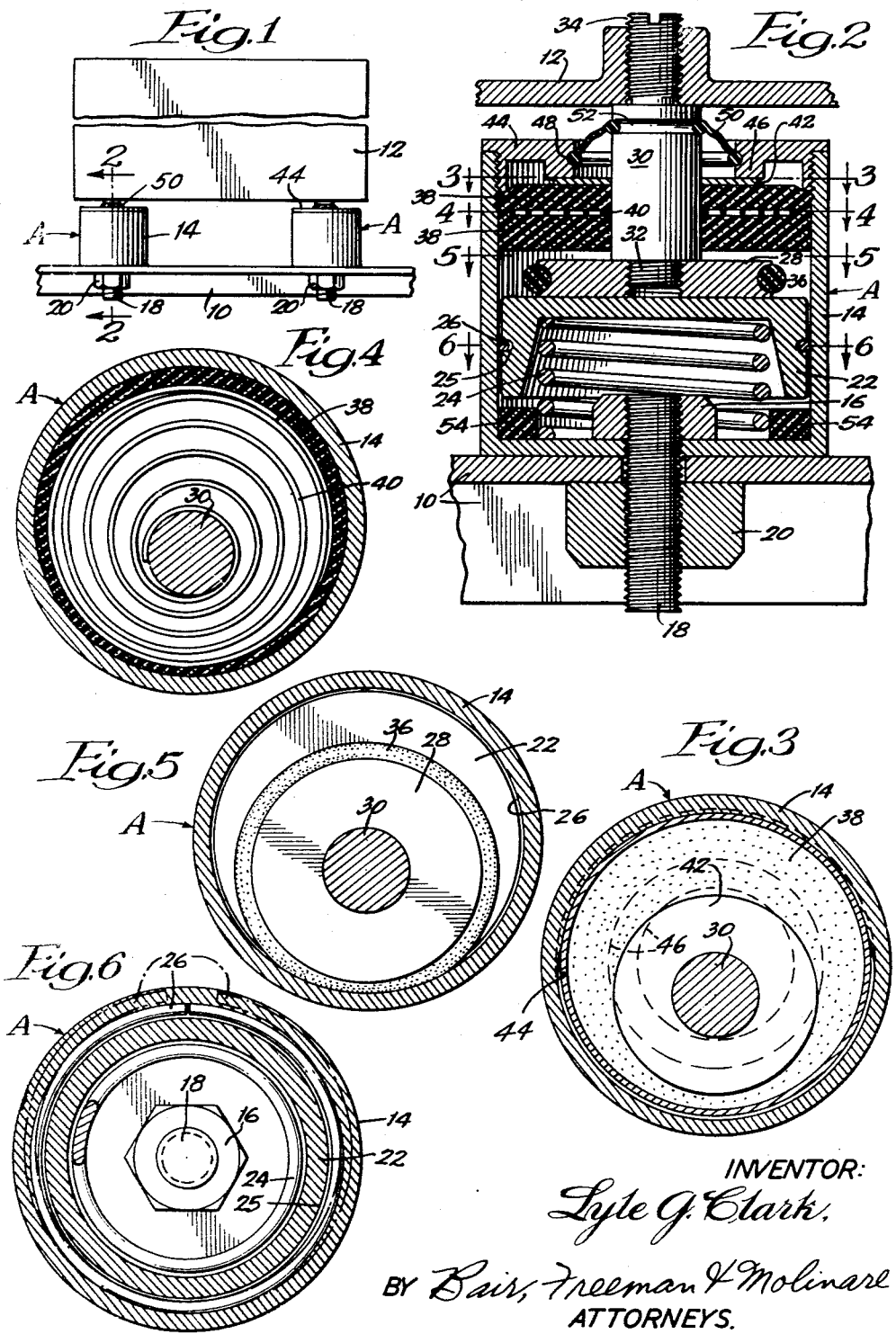
INVENTOR:
Lyle G. Clark,
BY Bair, Freeman & Molinare
ATTORNEYS.

United States Patent Office 2,942,834
Patented June 28, 1960

2,942,834

VIBRATION ABSORBER

Lyle G. Clark, Newark, Del., assignor to The Aro Equipment Corporation, Bryan, Ohio, a corporation of Ohio Filed Jan. 14, 1957, Ser. No. 633,888

6 Claims. (Cl. 248—358)

This invention relates to a vibration absorber in the form of a small unit, several of which may be used to support a mass relative to an air frame or other support in order to absorb or damp the transmission of vibrations from one to the other. The device is particularly adapted for supporting and vibrationally isolating liquid oxygen converters with respect to air frames although it is adaptable for the support of other masses for example; radio, radar and other electronic equipment used in airplanes.

One object of the invention is to provide a vibration absorber so designed as to operate efficiently and be manufactured economically, yet which will meet vibration absorber requirements in connection with relatively delicate instruments and the like, and particularly where it is desirable to minimize failure of equipment components as much as possible.

Another object is to provide a vibration absorber in the form of a unit, one end of which may be connected to a support such as an air frame and the other end conveniently connected to a mass whereby one or a plurality of the vibration absorbers support the mass in such manner as to absorb or damp the transmission of vibrations from the air frame to the mass.

Still another object is to provide a vibration absorber comprising a housing, a piston movable therein and supporting the mass, the piston being spring-loaded so that it can move vertically in the housing which serves as a cylinder therefor, means being provided for introducing friction between the piston and the cylinder to effect the desired damping action.

Still a further object is to provide the mass movably supported with respect to the piston for horizontal vibrations with means interposed between the cylinder wall and the mounting means for the mass which absorbs or damps horizontal vibrations.

An additional object is to provide means for sealing in the mechanism of the vibration absorber against entrance of foreign matter so as to insure proper functioning of the mechanism at all times.

With these and other objects in view, my invention consists in the construction, arrangement and combination of the various parts of my vibration absorber, whereby the objects above contemplated are attained, as hereinafter more fully set forth, pointed out in my claims and illustrated in detail on the accompanying drawing, wherein:

Fig. 1 is a side elevation of a pair of my vibration absorbers showing one method of mounting a mass in relation to a supporting frame;

Fig. 2 is an enlarged vertical sectional view on the line 2—2 of Fig. 1 showing details of construction of the vibration absorber; and Figs. 3, 4, 5 and 6 are horizontal sectional views on the respective lines 3—3, 4—4, 5—5 and 6—6 of Fig. 2 to show further details of construction.

On the accompanying drawing, I have used the reference character A to indicate in general the vibration absorber of the present invention. In Fig. 1, an air frame 10 is shown and a plurality of the vibration absorbers A are mounted thereon and support a mass 12. The mass 12 may be a liquid oxygen converter; or radio, radar or other electronic equipment, etc. One method of connecting the absorber to the air frame and the mass is shown in Fig. 2.

As for the details of the vibration absorber unit, reference is made to Figs. 2 through 6 wherein the reference numeral 14 indicates a housing which is of such character as to serve as a cylinder for a piston 22 therein. The housing 14 may be supported by means of a stud 18 threaded thereinto and a lock nut 16 which two elements may then be soldered in position. The stud 18 may be projected through an opening of the support 10 as illustrated in Fig. 2 and a mounting nut 20 threaded on the stud for attaching the housing 14 to the frame 10.

Below the piston 22 is a vertical loading spring 24, and received around a groove in the piston is a friction spring 26. As shown by dot-and-dash lines in Fig. 6, the diameter to which the friction spring 26 is initially formed is somewhat larger than the internal diameter of the cylinder 14 so as to provide a desired and controllable amount of damping friction. The friction spring 26 provides dry friction as the damping agent in the vertical direction.

Resting on the piston 28 is a damping shaft disc 28 connected with a damping shaft 30 by means of a threaded end 32 thereof. The shaft 30 also has a threaded end 34 that can be connected with the mass 12 in an obvious manner. A bumper ring 36 of rubber, neoprene or the like surrounds the disc 28 and is somewhat less in external diameter than the internal diameter of the cylinder 14 for a purpose which will hereinafter appear.

A pair of sponge rubber stop pads 38 surround the damping shaft 30 and are interposed between the disc 28 and a stop pad retainer washer 42. The vibration absorber A is shown loaded in Fig. 2, whereas in the initial position of its parts the spring 24 engages the piston 22 with the disc 28, the disc 28 with the lower stop pad 38 and the upper stop pad 38 with the washer 42 which in turn is engaged against a central hub 46 of a closure plate 44.

In the loaded position of the vibration absorber, the piston 22 is substantially centered between the lower stop pad 38 and a ring-like stop pad 54 in the bottom of the housing 14, which is also formed of sponge rubber or the like. The pads 38 and 54 tend to reduce the impact of any sudden shock loads applied to the mass.

The spring 24 (or springs when the mass is supported by a plurality of vibration absorber units) is calculated in relation to the mass so that when the mass is in the supported position, the spring force will equal the weight of the mass when the piston 22 is at the mid point of its stroke as illustrated in Fig. 2. As the air frame 10 which is experiencing forced vibration vibrates vertically, the cylinder 14 will oscillate up and down relative to the piston 22 which is connected to the mass 12. The frequency range of the vibration absorber is calculated to fall below the resonant frequency of the mass being isolated from the frame by means of selecting a suitable spring rate with regard to the mass. Enough friction is applied by the friction spring 26 rubbing against the inside of the cylinder 14 to damp any large amplitudes that might be encountered at the lower frequency range. The rate of the spring 24 and of the friction spring 26 is made to suit the required resonance conditions.

Imbedded between the two pads 38 is a horizontal snubber spring 40 of flat coil, spiral character as shown in Fig. 4 which, in conjunction with the pads, provides a low spring rate for horizontal vibrations. The washer 42 retains the upper pad 38 from protruding through the hub 46 of the closure plate 44 while still permitting the damping shaft 30 to vibrate in all directions. The boot 50 which is attached to the shaft assembly and the cover plate protects the inner mechanism of the vibration absorber from salt spray, sand and dust as well as other foreign matter which might cause binding and ultimate failure of the mechanism.

The damping shaft 30 has its horizontal motion limited as shown in Fig. 5 by the stop ring 36 striking the inner surface of the cylinder 14. The shaft is damped in its horizontal motion by the cooperative action of the pads 38 and the spiral spring 40. At the same time there is dry friction damping by contact of the disc 28 with the piston 22 under the weight of the mass and the pressure exerted by the spring 24. Both the disc and the piston are made of metal but preferably dissimilar metals.

In the horizontal direction the friction force between the metal surfaces tends to damp the horizontal motion of the mass 12, and at the same time the resulting compression of the sponge rubber acts as a weak-spring absorber so that in horizontal motion thereis both spring and dry friction absorbing actions. The spring rate relative to the resonance can be computed for whatever conditions are to be met.

Some changes may be made in the construction and arrangement of the parts of my vibration absorber without departing from the real spirit and purpose of my invention, and it is my intention to cover by my claims any modified forms of structure or use of mechanical equivalents which may reasonably be included within their scope.

I claim as my invention:

1. In a vibration absorber, a closed bottom cylinder having a partially closed top, a piston movable vertically therein, a loading spring for said piston, means for supporting a mass on said piston in opposition to said loading spring comprising an element having a surface resting on said piston and slidable horizontally relative thereto and a stem extending therefrom to the mass, said element being smaller in diameter than said piston to permit such horizontal sliding within said cylinder, a friction spring interposed between said cylinder and said piston to damp vertical vibrations, said surface frictionally engaging said piston to damp horizontal vibrations, a sponge rubber disc surrounding said stem and extending to said cylinder for further damping horizontal vibrations, said disc being interposed between the top of said element and the partially closed top of said cylinder to serve as a stop for said element upon movement in a direction for permitting said loading spring to extend, and a sponge rubber stop at the bottom of said cylinder for said piston to engage upon movement of said piston in the direction for compressing said loading spring.

2. In a vibration absorber, a closed bottom cylinder having an annular top, a spring-loaded piston movable vertically therein when supporting a mass, means for supporting such mass on said piston comprising an element having a surface resting on said piston and of smaller diameter than said piston whereby it is slidable horizontally relative thereto and within said cylinder, a supporting stem for the mass extending upwardly from said piston and through said annular top, said surface frictionally engaging said piston to damp horizontal vibrations, a friction spring interposed between said cylinder and said piston to damp vertical vibrations, two sponge rubber discs surrounding said stem and spanning the distance between it and the wall of said cylinder, a spiral spring between the two for further damping horizontal vibrations, and a sponge rubber stop for said piston at the bottom of said cylinder to stop said piston upon movement in the direction for compressing said loading spring.

3. In a vibration absorber, a closed bottom cylinder having a partially closed top, a piston movable vertically therein, a loading spring for said piston, means for supporting a mass on said piston comprising a metal element having a surface resting on said piston and slidable horizontally relative thereto within said cylinder during operation of said vibration absorber, a stem from said element to the mass, said element being of less diameter than said piston to permit such sliding, said surface frictionally engaging said piston with metal-to-metal contact to damp horizontal vibrations by means of dry friction, two sponge rubber discs surrounding said stem and extending to the wall of said cylinder, a spiral spring between the two for further damping horizontal vibrations, and a sponge rubber stop at the bottom of said cylinder for said piston upon movement in the direction for compressing said loading spring.

4. In a vibration absorber, a closed bottom cylinder, a metal piston movable both up and down therein when supporting a mass, a loading spring opposing such mass, said piston having a flat upper surface, means for supporting such mass on said piston comprising a metal element having a flat lower surface resting on said flat upper surface of said piston and of smaller diameter than said piston so that it is slidable horizontally relative thereto and within said cylinder during operation of said vibration absorber, a spiral spring resisting such horizontal sliding, a resilient bumper surrounding said element to limit such horizontal sliding, said surfaces frictionally engaging each other with metal-to-metal contact to damp horizontal vibrations by means of dry friction, and a metal friction spring interposed between said cylinder and said piston to damp vertical vibrations by means of dry friction.

5. In a vibration absorber, a closed bottom cylinder having an annular top, a piston movable both up and down in said cylinder, a loading spring for said piston, means for supporting a mass on said piston comprising an element having a lower flat surface resting on said upper flat surface of said piston and of smaller diameter than said piston whereby it is slidable horizontally relative thereto within said cylinder and a supporting stem for the mass extending upwardly from said element and through said annular top, a metal friction spring interposed between said cylinder and said piston to damp vertical vibrations by means of dry friction, and a flexible washer-like boot connecting said annular top of said cylinder to said supporting stem for sealing the mechanism of said vibration absorber within said cylinder, said boot having annular beads at its periphery and at its central opening and said annular top and stem having internal and external grooves respectively receiving said beads.

6. A vibration absorber comprising a closed bottom cylinder having a partially open top, a piston movable up and down therein when supporting a mass, a loading spring for said piston, means for supporting such mass on said piston comprising an element having a surface resting on said piston and of smaller diameter than said piston whereby it is slidable horizontally relative thereto and within said cylinder during operation of the vibration absorber, a stem from said element to the mass, a friction spring interposed between said cylinder and said piston to damp vertical vibrations, said surface frictionally engaging said piston to damp horizontal vibrations, and sponge rubber means surrounding said stem and interposed between it and the wall of said cylinder for further damping horizontal vibrations, said sponge rubber means comprising two sponge rubber discs interposed between said element and the partially open top of said cylinder, and a spiral spring between said two sponge rubber discs for further damping horizontal vibrations.

References Cited in the file of this patent

UNITED STATES PATENTS

| | | |
|---|---|---|
| 2,537,664 | Golding | Jan. 9, 1951 |
| 2,683,015 | Campbell | July 6, 1954 |
| 2,683,016 | Campbell | July 6, 1954 |
| 2,830,807 | Johnson | Apr. 15, 1958 |
| 2,900,162 | Crede | Aug. 18, 1959 |

FOREIGN PATENTS

| | | |
|---|---|---|
| 852,050 | Germany | Oct. 9, 1952 |